United States Patent [19]

Stockman

[11] Patent Number: 4,633,365
[45] Date of Patent: Dec. 30, 1986

[54] METALLIZED CAPACITOR WITH PROTECTIVE INTERRUPTER DEVICE AND METHOD OF MAKING THE SAME

[75] Inventor: Robert M. Stockman, Brookfield Center, Conn.

[73] Assignee: American Radionic Co., Inc., Danbury, Conn.

[21] Appl. No.: 708,356

[22] Filed: Mar. 5, 1985

[51] Int. Cl.[4] .......................... H01G 1/11; H01G 1/14
[52] U.S. Cl. .................................... 361/272; 361/310; 361/275
[58] Field of Search ............... 361/331, 272, 275, 278, 361/306, 307, 308, 309, 310

[56] References Cited

U.S. PATENT DOCUMENTS 3,109,969 11/1963 Seidel ............................. 361/310 X
3,185,905 5/1965 Sternbeck ........................ 361/272
3,792,323 2/1974 Stockman ....................... 361/275

Primary Examiner—L. T. Hix
Assistant Examiner—Douglas S. Lee
Attorney, Agent, or Firm—Parmelee, Bollinger & Bramblett

[57] ABSTRACT

A metallized capacitor is formed by winding at least two thin metallized dielectric films into a cylinder, the ends of which are sprayed or metallized and connected to externally mounted terminals. A protective interrupter is provided by connecting a very thin electrically conductive strip to one of the metallized ends and running the conductive strip over the surface of the outside metallized film to one of the externally mounted terminals. The capacitor so formed is embedded in heat cured epoxy so that the strip is integrated within the rigid epoxy case. Accordingly, the strip will tear or separate on any swelling or cracking of the epoxy case due to a faulty capacitor and thereby interrupt the power supply. The conductive strip may be scored at intervals along the length thereof in order to enhance its shearing or tearing ability.

5 Claims, 7 Drawing Figures

U.S. Patent    Dec. 30, 1986    4,633,365
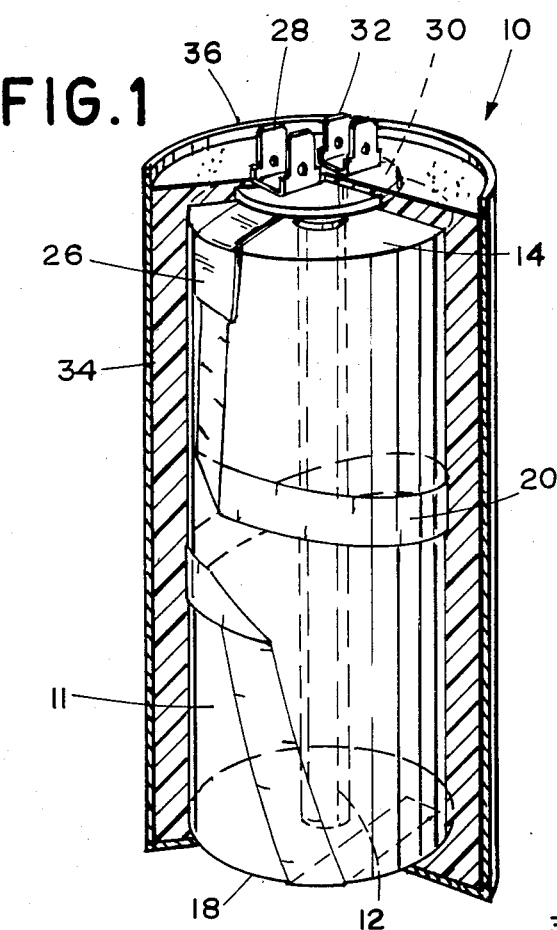
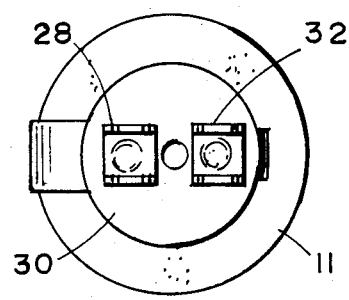
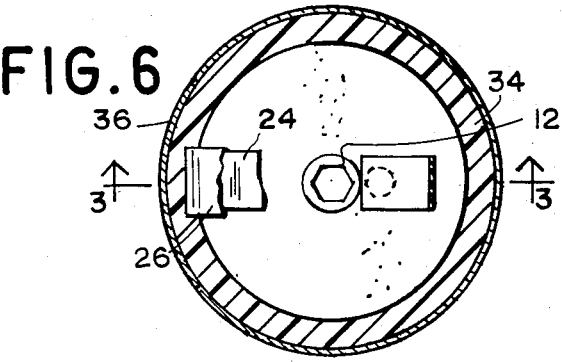
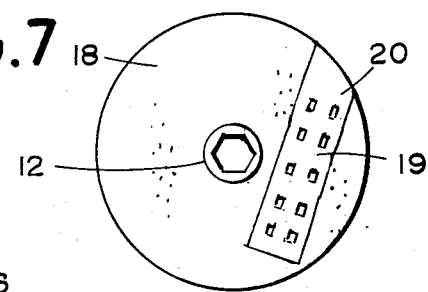
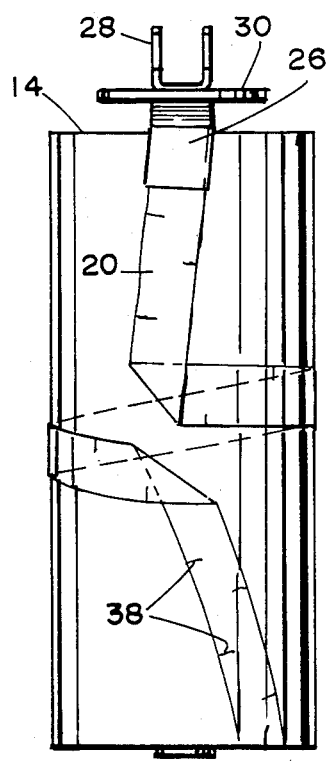
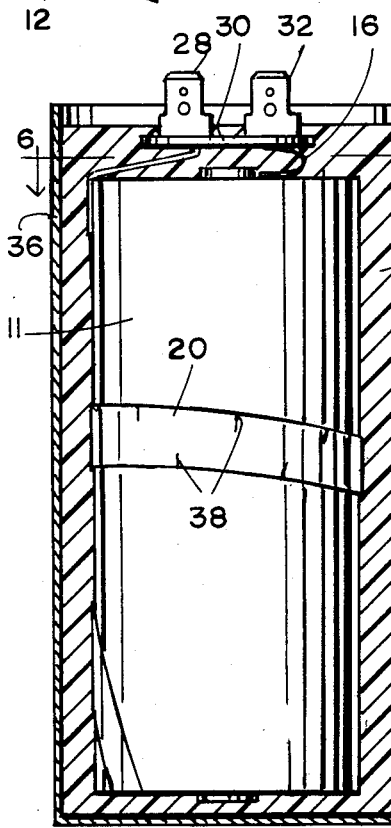
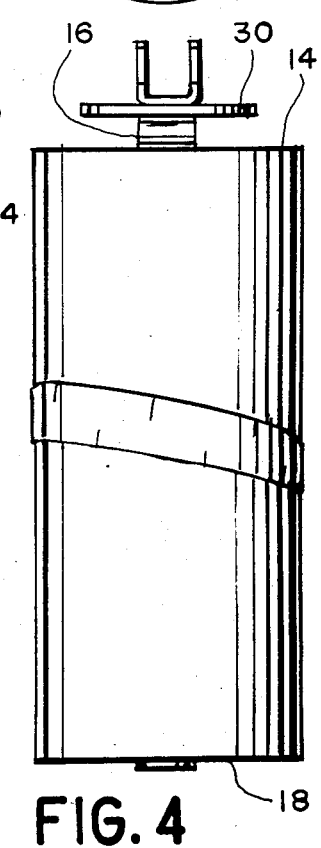

METALLIZED CAPACITOR WITH PROTECTIVE INTERRUPTER DEVICE AND METHOD OF MAKING THE SAME

BACKGROUND OF THE INVENYION

This invention relates to cylindrical, metallized film wound capacitors and, more particularly, to such capacitors and the method of making the same which provide a protective interrupter device incorporated in the construction.

Very large size capacitors have been made from foils separated by a dielectric layer and characteristically packaged in an oil filled can. The oil increases the dielectric constant of the dielectric layer to increase the capacitance of the can type capacitor. In such capacitors the foil is thick enough such that any overload or malfunction of the capacitor would tend to short the layers of foil which would probably short a circuit breaker or fuse protecting the power supply which supplies the power across the capacitor. In view of the toxic nature of gases which may be generated from a faulty oil filled can type capacitor and the desirability of eliminating combustible fluid from the capacitor, dry type can packaged capacitors wound from metallized films have been produced. The metallized layers which form the plates of the capacitors are on the order of one millionth (0.000001) of an inch thick. Such metallized capacitors have a tendency under certain conditions to exhibit failure modes involving heavy clearings which lead to internal sparking and possibly combustion. Accordingly, the metallized capacitors do not tend to short as foil and film capacitors would. The metallized layer is so thin that it tends to vaporize and continues to do so while voltage is being applied. Accordingly, under such circumstances burning and an explosion could take piece.

Accordingly, it is an object of this invention to provide a metallized capacitor with a protective interrupter device incorporated therein to disconnect the power supply in the event of an internal fault.

A further object of this invention is to provide a new and improved metallized capacitor with a protective interrupter device incorporated in its construction whereby potential injury from fire or explosion is avoided.

Still another object of this invention is to provide a protective device for a metallized capacitor which is simple in construction and may be readily incorporated in a capacitor.

SUMMARY OF THE INVENTION

In carrying out this invention in one illustrative embodiment thereof, a large metallized capacitor having a protective interrupter device is provided of the type having two metallized dielectric films wound on a core to form at least one capacitor section. The plates of the capacitor, formed by the metallized layers, are exposed on opposite ends of the section. These ends are metallized and connected to externally mounted terminals. A very thin electrically conductive metal strip is connected to one of the metallized ends and wrapped around the surface of the section to one of the externally mounted terminals. The capacitor section is embedded in an encapsulant such as heat cured epoxy whereby the strip is integrated within the rigid epoxy. Accordingly, any expansion or cracking of the epoxy case will tear of separate the conductive strip to interrupt the power supply to the capacitor. The capacitor section is preferably encircled at its midpoint by the strip which may be scored for aiding in its separation on any movement of the epoxy in which it is encased.

BRIEF DECRIPTION OF THE DRAWINGS

The invention, together with further objects, aspects, features and advantages thereof will be more clearly understood from the following description taken in connection with the accompanying drawings.

FIG. 1 is a perpective view in partial cross-section of the metallized capacitor and protecting interrupter device in accordance with the present invention;

FIG. 2 is a side elevational view of the capacitor of FIG. 1 with the epoxy case removed;

FIG. 3 is a front elevational view of FIG.1 with the epoxy case is cross-section;

FIG. 4 is an elevational view similar to FIG. 2 but from the opposite side;

FIG. 5 is a top view of the capacitor with the epoxy case removed;

FIG. 6 is a cross-sectional view taken along line 6—6 of FIG. 3;

FIG. 7 is a bottom view of the metallized capacitor illustrated in FIG. 5.

DECRIPTION OF THE PREFERRED EMBODIMENTS

The metallized capacitor in accordance with the present invention is wound in a conventional manner utilizing first and second metallized dielectric films. One film has a thin metallic layer which extends to the right edge of the film but terminates short of the left edge leaving a non-metallic strip therealong. The other metallized film similarly carries a thin metallic layer on its surface which extends from the left edge of the film and terminates short of the right edge to form a non-mettalic strip along that edge. The ends of the cylindrical wound capacitor section are metallized or spray coated with metal, and leads may be attached thereto by soldering. Since the winding and attaching of leads as described form no part of the present invention, and are shown and described in my prior U.S. Pat. No. 3,792,323, they are not further described.

Referring now to FIG. 1, a metallized dielectric capacitor, referred to generally with the reference character 10, is tightly wound in many layers to form a generally cylindrical section 11 on a core 12. The top 14 of the section is metallized having an electrical connection 16 thereto (see FIGS. 3 and 4) while the bottom 18, as best shown in FIG. 7, has a connection thereto in the form of an electrically conductive strip 20 having end 19 electrically connected to the metallized bottom 18 by soldering, spot welding or any other suitable means.

Electrically conductive strip 20 is preferably in the form of an extremely thin soft copper ribbon having a thickness, for example, on the order of 1 mil. The conductive strip 20 extends from the bottom 18 of section 11 the length of the outer surface of section 11 circling it about midway between the ends 14 and 18. The strip 20 terminates at an end 24 (see FIG. 6) covered by insulation 26 where it is connected to an electric terminal 28. Terminal 28 is mounted on a phenolic insulator disc 30 which also contains an electrical terminal 32 coupled to the electrical connector 16 which conects to the other plate of the capacitor section 11 through metallized end 14. Accordingly, one plate of the capacitor section 11 is connected to electrical terminal 28 through the electrical strip 20 while the other plate of the capacitor section 11 is coupled to the electrical terminal 32. Thus, the strip 20, if interrupted, will prevent the application of power to the top and bottom metallized plate connections, 14 and 18, of the capacitor section 11.

The capacitor section so formed is completely embedded in a suitable encapsulant such as a resin based two part thermal setting epoxy 34, of the type commonly used for potting and similar applications, within an open-top cylindrical container, or case, 36. This forms a capacitor having electrical terminals 28 and 32 extending form the top for connecting the capacitor to an external electrical circuit. The case 36 may be formed from a suitable plastic.

As has been pointed out, the electrical strip 20 preferably is formed from very thin, soft, copper ribbon which has very little mechanical strength on its own. This very thin, electrical conducting strip 20 connects the end 18 of the capacitor section 11 to the externally mounted terminal 28. The electrical strip 20 is totally embedded in the rigid, rather brittle, epoxy 34 and becomes integrated in this material. The strip 20 extends the length of the capacitor section 11 and encircles the capacitor at its mid-point in order to cover the areas where the capacitor is most likely to fracture. As will be apparent, several encirclements of the strip 20 may be made, if so desired.

In operation, if power is applied to the exterior terminals 28 and 32 of the capacitor 10 and the capacitor exhibits a failure mode leading to internal arcing or vaporizing, a serious danger of explosion and fire would exist. However, with the present construction, minimal burning will occur because any amount of gassing or vaporization will tend to swell section 11 and crack the epoxy 34 which would result in tearing or separation of the strip 20, effectively disconnecting the power source from the top and bottom metallized plate connections, 14 and 18, of capacitor section 11. This shearing or tearing ability of the strip 20 may be enhanced by selectively scoring, cutting, nicking, notching or otherwise weakening the strip 20 in any desired manner along its length as illustrated with the reference numeral 38 in the drawings. The scoring 38 assists in the tearing effect so that even a minimal movement or cracking of the epoxy 34 will rip the strip 20, and thus interrupt the electrical circuit to the capacitor 10. The disruption of the circuit will eliminate or substantially minimize, the chance of explosion or fire.

The overall mechanical strength of the epoxy encased capacitors is derived from the cured epoxy as opposed to similar capacitor windings which are encapsulated in the old style steel and steel and aluminum cans. In the present invention, the strip 20 is spot-welded or soldered at 19 to the metallized end 18 of the capacitor section 11 in a way providing excellent contact but minimal mechanical strength prior to encapsulation. Consequently, any blow-out on the ends of the case would provide a lifting of the epoxy covering the top or bottom ends of the capacitor which effectively would break away the strip 20 from its top and bottom connections. This provides another circuit breaking arrangement which is superior to any which could be provided in a heavily welded connection such as the type employed in the use of steel or aluminum can enclosures for capacitors. Thus, the metallic strip construction embedded in the epoxy provides a failsafe approach whether separation comes from the connection of the strip to the plates of the capacitor or whether it comes from a cracking or swelling of epoxy where encased.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. The method of making a metallized film capacitor with a protective interrupter device which is wound using at least two metallized films on a core to form at least one capacitor section comprising the steps of:
   metallizing the ends of the capacitor section;
   connecting one of said ends to a first externally mounted terminal;
   connecting a very thin elecrically conductive strip to the other metallized end and running said conducting strip over the surface of said section and encircling said section near the mid-point between the ends thereof to a second externally mounted terminal; and
   embedding said electrically conducting strip and said capacitor section in a rigid encapsulant whereby said strip is integrated within the encapsulant and will tear or separate on any swelling or cracking of the encapsulant.

2. The method as claimed in claim 1 including the step of selectively scoring said strip for aiding in the separation of said strip on any movement of said encapsulant.

3. In a wound metallized film capacitor of the type having first and second conductive plates formed by metallized film and separated by the dielectric film, the first plate exposed at one end and the second plate exposed at the other end of the capacitor, a protective interrupter for said capacitor comprising:
   a pair of external electrical terminals;
   a thin electrically conductive strip extending the length of the outer surface of said capacitor, encircling the capacitor at least once near the mid-point between its ends, and connecting said first plate of said capacitor to one of said external electrical terminals;
   means for connecting said second plate to said other external electrical terminal; and
   a rigid encapsulant encasing said electrical strip and said capacitor whereby any movement of said encapsulant caused by an internal malfunction of said capacitor will never said strip thereby interrupting any external connection to said electrical terminals.

4. In a wound metallized film capacitor, the protective interrupter as claimed in claim 3, in which said strip has cuts therein in order to aid in the separation thereof when the surrounding encapsulant in which said strip is embedded cracks or moves.

5. The interrupter of claim 3 wherein said encapsulant is a heat curing epoxy.

* * * * *